March 17, 1936. J. A. MILLER 2,034,111
RECORDING OF OSCILLATIONS ON A CARRIER
Filed July 19, 1934
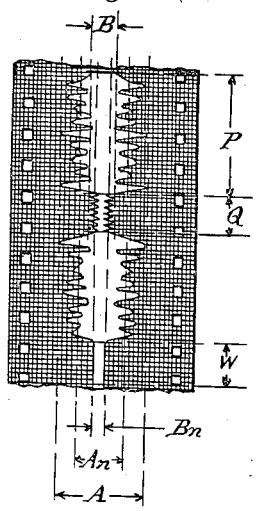
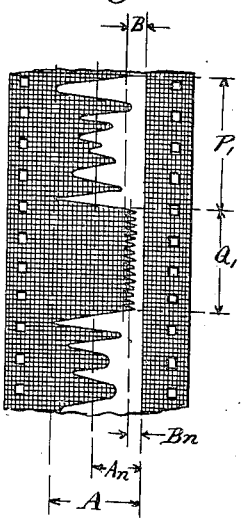
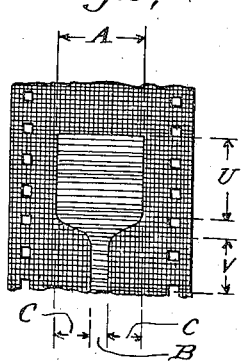
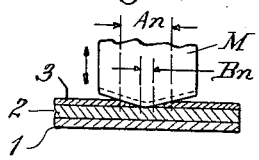
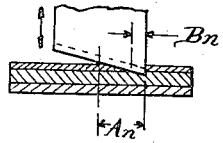
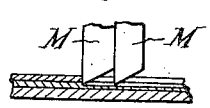
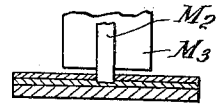
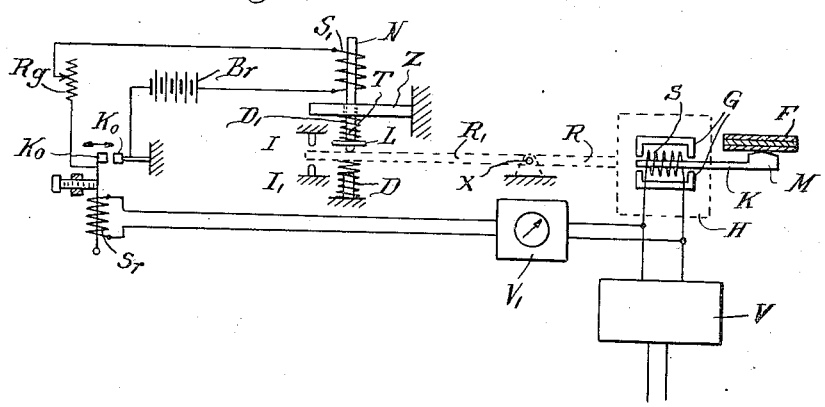
INVENTOR
James A. Miller
BY
ATTORNEYS Patented Mar. 17, 1936

2,034,111

UNITED STATES PATENT OFFICE 2,034,111

RECORDING OF OSCILLATIONS ON A CARRIER

James A. Miller, Flushing, N. Y.

Application July 19, 1934, Serial No. 735,956
In Germany March 1, 1933

9 Claims. (Cl. 179—100.4)

This invention relates to a method of and a device for mechanically recording oscillations, particularly sound oscillations, on a carrier, preferably a film.

According to the invention, the zero position of the recording member is altered in steps, either automatically or manually, in accordance with the value of the amplitude to be recorded.

The expression "zero-position" is to be understood hereinafter to mean that position which the recording member has relatively to the carrier when there are no oscillations. For the sake of simplicity generally two steps will be referred to hereinafter although obviously more than two steps can be chosen according to circumstances.

By carrying out the method according to the invention it is possible to cause the recording member in any step to cut to a different mean depth of the recording layer in such manner, for example, that at the small amplitudes, which generally occur at high frequencies, the operation is effected more superficially in the recording layer where the resistance produced by the carrier material on the recording member is lower than in the deeper layers. This ensures a more easy recording of the smaller amplitudes which is of particular service in connection with the recording of high frequencies.

A further advantage of the method according to the invention is that the heating of the recording tool (for which preferably a sapphire is used) which in the usual case in which the tool operates continually at the same mean depth of the recording layer increases to an inadmissibly great extent is materially decreased and leads to less deterioration as the heating never occurs continuously on the same spot of the tool.

In addition, the tool is worn more uniformly which is also due to the fact that it is not constantly the same zones thereof that are in touch with the recording material.

It is known in connection with the recording of sound oscillations by optical means for the purpose of decreasing the undesired noise produced during optical reproduction to cause the zero positions of the recording member in the amplitude system, or the blackening at rest in the intensity system, to vary continuously. An attendant disadvantage of this is in that with a very sudden passage from a small amplitude to a comparatively large amplitude the inertia of the regulation is so high that the peaks of the large amplitudes are cut off in the first period of the passage.

The stepwise regulation according to the invention offers in comparison with continuous regulation an improvement in that within a single step on occurrence of the above-mentioned sudden variation in the ratio between the smallest and largest amplitudes the peaks of the latter are not cut off because the recording capacity of the distinct steps is chosen from the start so that the peaks of the largest amplitudes can be recorded without distortion. The use of steps permits therefore of materially improving the quality of the total recording. It is true that consequently within the distinct steps the improvement will be slightly less but the invention provides the means of decreasing simultaneously the injurious effect of the various difficulties mentioned.

Obviously, the method according to the invention can be used in very different recording systems. It can be used for example for recording by the known amplitude system as well as by the similarly known density or intensity system. In addition, the invention is not limited to the mechanical reproduction of the record which at the present day is still in general use, but can also be used for optical reproduction; the combination mechanical recording with optical reproduction introduces considerable advantages, as is commonly known. Thus, for example, the mechanical recording method offers in comparison with the purely optical method the advantage of permitting the record to be reproduced immediately upon recording, even within the recording apparatus, since a chemical treatment as required in the optical method is unnecessary. In addition, the advantage of optical reproduction subsists to the full extent.

When the intensity or density-method is followed, use is made not only of a recording member which records the intensity of the oscillations below a given limit stepwise in an amplified manner, but also of a member by means of which subsequent to the recording of the oscillations the reproducing capacity of the carrier is stepwise decreased in accordance with the above-mentioned amplification. This may be realized mechanically, for example, by a chisel of constant width producing a hill and dale track. According to the invention, the mean energy which is supplied to this chisel below a given limit of intensity, say 28 decibels, should be increased in such manner as to equalize about the mean value of the intensity beyond this limit. This is generally referred to as the "constant volume method". Thus the advantage is ensured that the feeble amplitudes are recorded in a substantially improved manner. The intensity curve is, however, distorted so that it is necessary either at once or subsequently to use means for restoring the original intensity conditions during reproduction. This may be effected, for example by means of a second chisel which alters the width and thus the reproducing capacity of the total recording track by partial removal of the track in steps, that is to say reduces it below a given limit of intensity.

Use is preferably made of the method according to the invention for recording sound oscillations by mechanical means according to the amplitude method. The device for carrying out this method comprises, for example, a relay which in accordance with the various maximum values of the intensity curve which are fixed from the start is controlled by part of the energy supplied to the recording tool and which is inserted in a regulating circuit which includes a device, for example a coil with magnet core, by means of which the neutral position of the recording tool, preferably the position of the movable member that carries the recording tool, can be altered.

In order that the invention may be clearly understood and readily carried into effect a few embodiments thereof will now be described more fully with reference to the accompanying drawing. It is obvious that the invention extends not only to the carriers which are produced directly by means of the recording method according to the invention but also to carriers that can be obtained by means of the first mentioned one in conjunction with known manufacturing methods. The characteristic feature of the recording method according to the invention is also recognizable on these carriers.

For the sake of simplicity the figures illustrate throughout carriers in the form of a film although the invention is not limited to band-shaped carriers of this kind but may be applied to carriers of different shape, for example to disc-shaped carriers such as talking machine records.

Fig. 1 is a plan of a film provided with a sound track modulated on either side.

Fig. 2 shows the manner of mechanically recording such a track.

Fig. 3 is a plan of a film on which the sound track has been formed in a slightly different manner.

Fig. 4 shows the manner of mechanically recording the sound track shown in Fig. 3.

Fig. 5 shows a portion of a film on which the sound track has been recorded by the intensity method.

Fig. 6 shows the mechanical recording of a sound track of the type shown in Fig. 5.

Fig. 7 is a side view of Fig. 6.

Fig. 8 shows a further possibility of mechanically recording a sound track of the type shown in Fig. 5.

Fig. 9 is a diagram of an arrangement for recording oscillations by mechanical means by the method according to the invention.

The film strips shown in the drawing are portions of films carrying sound records only. Obviously, these sound tracks may be portions of a picture-plus-sound film.

The film shown in Fig. 1 is possessed of a sound track obtained by the amplitude method and capable of being produced by mechanical means as well as by optical means.

In the mechanical recording method use is made, for example, of a chisel as shown in Fig. 2 comprising a V-shaped cutting edge cutting away larger or smaller parts of the film surface by moving relatively to the carrier in a direction forming with the carrier surface an angle of 90° at the most.

When no oscillations are being recorded, the chisel cuts a non-modulated track of given width (in the Figures $A_n$ and $B_n$). This non-modulated track is consequently cut in the zero position of the recording member.

Now, in accordance with the invention the recording capacity of the carrier is altered stepwise during recording. The steps are chosen quite definitely. When it is desired to record sounds having a strength of sound of about 0 to 40 decibels, this intensity range is divided into several steps and the latter are brought out in the sound track.

Even a division of the intensity range into but 2 steps ensures a substantially better load of the cutting surface of the recording tool. Generally, no greater strength of sound than 40 to 50 decibels is needed to be recorded. If it is desired to record a wider intensity range, there is no objection at all to choosing more steps.

In practice the following procedure is followed (Fig. 1):

It is possible to record on the entire film portion which is available for sounds and the width of which is usually about 2 mms. even the sounds of maximum intensity, consequently of about from 40 to 50 decibels. A film of such kind has therefore a recording capacity of from 40 to 50 decibels.

In the case of sounds having a strength of about 28 to 40 decibels, the whole available width A (Figure 1) is used. The track recorded in the zero position has therefore a width $A_n$. When the entire width available is 2 mms., the value of $A_n$ is 1 mm. (Figs. 1 and 2).

The part P of the film has therefore recorded on it oscillations having a strength of about 28 to 40 decibels; for example, a chisel as shown in Fig. 2 may be used to cut away parts of the carrier. The carrier may comprise a substratum 1, for example of celluloid, a soft intermediate layer 2 (for example of gelatine) in which the sound track is cut and a black covering layer 3. This covering layer may also after recording on a transparent carrier be applied to the latter for the purpose of obtaining the difference in transparency, necessary for reproduction, of the various spots of the sound track.

As soon as the strength falls below a given value (for example 28 dbs.) the zero position of the recording member is altered, for example, in such manner that the non-modulated track (for example the track W shown in Fig. 1) is only 0.25 mm. in width (in Figs. 1 and 2 the distance $B_n$.) In this case the width B which is available for the intensity range below 28 dbs. is but 0.5 mm.

Hereinbefore portions of the sound track are referred to as having a width $A_n$ and $B_n$.

In general, these widths may be referred to as the mean widths of the transparent portion of the sound track.

It has been found to be easily possible automatically to bring about this alteration of the zero position in 1/50 sec.

The track shown in Fig. 3 also shows a length $P_1$ throughout which sounds of high strengths are recorded. Again, the width available and the width of the non-modulated track are designated by A and $A_n$ respectively and the distance $Q_1$ is possessed of a lower recording capacity. The corresponding distances B and $B_n$ are shown as well. It is, of course, obvious that such a track can be produced mechanically by a chisel of the type shown in Fig. 4, the zero position of which can therefore be altered (position shown in Fig. 4 in dotted lines). The direction of movement of the chisel is indicated by the arrow. During recording, the carrier moves normally to the plane of drawing.

The sound track shown in Fig. 5 has been produced by the intensity method that is to say the transparency of the carrier varies in accordance with the amplitudes of the oscillations recorded. Such a track can be produced mechanically by means of a chisel M having a flat cutting edge as shown in Fig. 6 which cuts more or less deeply in carrier material the transparency of which varies with the thickness of the carrier.

Again, through the distance U oscillations having an intensity of about 28 to 40 dbs. are recorded and through the distance V oscillations having an intensity of 0 to 28 dbs. In this part of the sound track, the amplitudes of the oscillations which are recorded with the chisel are preferably amplified more than normally, but the divergence of the intensity from the normal one is balanced by the width of the track, which at the outset was A being reduced to a measure B. In this portion the parts C have also been cut by the chisel M are cut away by means of one or more chisels $M_1$ which are arranged directly behind the chisel M (Figs. 6 and 7) or treated in any suitable way in such a manner that no sound track is present. Alternatively this may be effected, for example, with members by means of which these parts are blackened during recording, for example ink-burins or pens.

The two recording members are preferably controlled stepwise by an amplifier which in accordance with the various steps, chosen from the start of the intensity of the oscillations similarly amplifies in steps.

The measure C which has to be cut away or screened, when amplifying more than normally in the part V is given by the value of this supplementary amplification and the correspondingly increased transparency of the carrier material. The latter increase is dependent in its turn on the characteristic curve of transparency of the carrier material. The measure C has to be chosen in accordance with this characteristic curve.

As an alternative, the parts V of the sound track shown in Fig. 5 may be produced as shown in Fig. 8 by means of a narrow chisel $M_2$, whereas the parts U are produced with a wide chisel $M_3$ which tools therefore become operative alternately in accordance with the steps chosen and therefore are brought into a certain zero position. In this case the chisel $M_2$ records oscillations the intensity of which is amplified beyond the normal one, i. e., to a greater extent than the oscillations recorded by the chisel $M_3$.

Fig. 9 shows the arrangement for carrying out the method according to the invention by the amplitude system. It is assumed that in the said arrangement two definite steps in the intensity range (in the case of sound oscillations in the range of strengths of sound) have been chosen.

The amplifier V leads the amplified currents which correspond to the amplitudes of the oscillations to be recorded, for example microphonic currents, to a coil S which influences a magnetic circuit (pole pieces G) so that the armature K which carries at its end the chisel M shown in Fig. 2 is moved.

The film which is assumed to move normally to the plane of the drawing is designated by F. The magnet system is fixed together with the housing H to an arm R pivoted at the point X. By alteration of the position of this arm, by rocking the same about the point X, the zero position of the chisel M is altered.

Two springs D and $D_1$ act on the extended part $R_1$ of the arm and are capable of forcing the arm against stops I and $I_1$.

The springs D and $D_1$ are both compression springs. The spring $D_1$ bears at one of its ends on a disc L secured to a rod T and at its other end on a stationary support Z. The rod T forms part of a magnet core N which a coil $S_1$ is arranged to surround. This coil is included in a circuit supplied from a battery $B_r$ and including in addition a control device $R_g$ and two contacts $K_0$. One of these contacts is stationary and the other is adapted to move relatively to it. It is moved by a magnet (not shown) and a coil $S_r$. The latter is included in a circuit which is tapped across the output circuit of the amplifier. The currents amplified by the amplifier V are therefore led in part to the coil $S_r$, preferably via a second amplifier $V_1$ comprising a device for measuring the energy. As long as oscillations in the range of for example from 0 to 28 dbs. are recorded, the contacts $K_0$ are in touch. The coil $S_1$ is traversed by a current which is sufficiently great to maintain the core N in a raised position so that the spring $D_1$ does not act materially on the arm $R_1$ but the spring D keeps this arm bearing on the stop I. When, however, the intensity of the oscillations exceeds a given value, the contacts $K_0$ are separated from each other.

The flow of current in the coil $S_1$ is thus interrupted. The powerful spring $D_1$ can force the arm against the action of the spring D into contact with the stop $I_1$. The chisel is caused to occupy the position in which a length P as shown in Fig. 1 is cut.

The contacts $K_0$ form together with the coil $S_r$ and magnet a relay which may preferably be replaced by one or more grid-controlled discharge tubes. Such tubes offer in comparison with mechanical relays the advantage of working practically without any inertia and of a much more simple use. In this case, the currents of the amplifier $V_1$ are led to the grid of the tube. Use is, preferably, made of several of such tubes when working in more than two steps.

In principle, the device outlined can also be used for optical recording methods. In this case the chisel and its accessories are replaced by an optical recording member, preferably an oscillograph and the coil $S_1$ permits of the zero position of this recording member being altered stepwise.

I claim:

1. The method of recording sound on a coated film by mechanically removing a portion of the coating, which comprises shifting the position of the coating-removing member to a predetermined number of zero positions, and retaining the recording member in each zero position to record sound of various intensities within a predetermined range of intensities.

2. The method of recording sound on a film carrier by mechanically removing a portion of the coating, which comprises maintaining the coating-removing member in one predetermined definite zero position so long as the intensity of the sound remains below a given intensity whereby the coating-removing member while in such zero position records sounds of various intensities below said given intensity, and shifting said coating-removing member to another definite zero position when the sound reaches said given intensity and retaining the coating-removing member in said last-named zero position so long as the intensity of the sound remains above said given intensity whereby the coating-removing member while in said last-named zero position records sounds of various intensities above said given intensity.

3. The method of recording sound on a coated film by mechanically removing a portion of the coating which comprises retaining the coating-removing member in one predetermined definite zero position so long as the intensity of the sound remains within a predetermined intensity range and below a given intensity, shifting the coating-removing member to another predetermined definite zero position when the sound reaches said given intensity, retaining the coating-removing member in said last-named zero position so long as the intensity of the sound remains within a second predetermined intensity range and above said given intensity, amplifying the normal oscillations of the coating-removing member when it is in said first-named zero position, and decreasing the width of that portion of the recorded track formed when the recording member is in said first-mentioned zero position.

4. In a system of recording sound on a coated film, a coating-removing member, means for shifting the position of said coating-removing member to a predetermined number of zero positions, and means for retaining the coating-removing member in each zero position to record sound of various intensities within a predetermined range of intensities.

5. In a system of recording sound on a coated film, a coating-removing member, energy-supplying means therefor, electrically controlled means for shifting the coating-removing member to at least two definite zero positions, and a relay for controlling the operation of said electrically controlled means, said relay being electrically connected with said energy-supplying means and controlled by at least a part of the energy supplied to the recording member.

6. In a system of recording sound on a coated film, a coating-removing member, energy-supplying means therefor, electrically controlled means for shifting the recording member to at least two definite zero positions, a relay for controlling the operation of said electrically controlled means, said relay being electrically connected with said energy-supplying means and controlled by at least a part of the energy supplied to the recording member, and an amplifier located between said energy-supplying means and said relay.

7. In a system of recording sound on a coated film, a coating-removing member, energy-supplying means therefor, electrically controlled means for shifting the coating-removing member to at least two definite zero positions, said means comprising a movable core, an electrical coil co-operating therewith and a spring for moving the core in one direction when said coil is de-energized, a part movable with the coating-removing member and adapted to be moved in one direction by said spring and core when the coil is energized, a stop for limiting the movement of said part, and a second spring urging said part in the opposite direction, and a relay for controlling the operation of said electrically controlled means, said relay being electrically connected with said energy-supplying means and controlled by at least a part of the energy supplied to the coating-removing member.

8. In a system of recording sound on a carrier, a recording member, energy-supplying means therefor, electrically controlled means for shifting the recording member to at least two definite zero positions, and a relay controlled at least in part by the energy supplied to the recording member, said relay having contacts adapted to cause energization of said electrically controlled means when the sound is within a predetermined intensity range and de-energization thereof when the sound is within another predetermined intensity range.

9. In a system of recording sound on a carrier, a recording member, energy-supplying means therefor, electrically controlled means for shifting the recording member to at least two definite zero positions, said means comprising a movable core, an electrical coil co-operating therewith and a spring for moving the core in one direction when said coil is de-energized, a part movable with the recording member and adapted to be moved in one direction by said spring and core when the coil is energized, a stop for limiting the movement of said part, and a second spring urging said part in the opposite direction, and a relay for controlling the operation of said electrically controlled means, said relay being electrically connected with said energy-supporting means and controlled by at least a part of the energy supplied to the recording member.

JAMES A. MILLER.